/ United States Patent /
Doebrich et al.

(10) Patent No.: US 7,702,102 B2
(45) Date of Patent: Apr. 20, 2010

(54) METHOD FOR ENCODED DATA TRANSMISSION VIA A COMMUNICATION NETWORK (75) Inventors: Udo Doebrich, Karlsbad (DE); Roland Heidel, Kandel (DE); Edmund Linzenkirchner, Eggenstein-Leopoldshafen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/563,504

(22) PCT Filed: Jul. 6, 2004

(86) PCT No.: PCT/EP2004/007378

§ 371 (c)(1),
(2), (4) Date: Jun. 23, 2006

(87) PCT Pub. No.: WO2005/004381

PCT Pub. Date: Jan. 13, 2005

(65) Prior Publication Data

US 2006/0230269 A1 Oct. 12, 2006

(30) Foreign Application Priority Data

Jul. 7, 2003 (DE) ............................. 103 30 643

(51) Int. Cl.
*H04L 9/08* (2006.01)
*H04L 9/32* (2006.01)

(52) U.S. Cl. .................... 380/44; 380/283; 713/171
(58) Field of Classification Search .............. 380/44, 380/283
See application file for complete search history.

(56) References Cited

U.S. PATENT DOCUMENTS

| 5,745,578 | A | * | 4/1998 | Hassan et al. ............. 380/44 |
| 5,781,458 | A | * | 7/1998 | Gilley .................... 708/255 |
| 6,031,913 | A | * | 2/2000 | Hassan et al. ............. 380/44 |
| 6,947,559 | B2 | * | 9/2005 | Gleeson .................. 380/41 |
| 6,973,499 | B1 | * | 12/2005 | Peden et al. ............. 709/229 |
| 7,215,775 | B2 | * | 5/2007 | Noguchi et al. ........... 380/249 |
| 2002/0023216 | A1 | * | 2/2002 | Noguchi et al. ........... 713/171 |
| 2002/0034300 | A1 | | 3/2002 | Thuvesholmen et al. |
| 2002/0131592 | A1 | * | 9/2002 | Hinnant .................. 380/46 |
| 2002/0154769 | A1 | * | 10/2002 | Petersen et al. .......... 380/42 |
| 2003/0033537 | A1 | * | 2/2003 | Fujimoto et al. .......... 713/193 |
| 2006/0190726 | A1 | * | 8/2006 | Brique et al. ............ 713/168 |

FOREIGN PATENT DOCUMENTS

| CN | 1222275 A | 7/1999 |
| WO | WO 97/49213 | 12/1997 |
| WO | WO 02/063462 A2 | 8/2002 |

* cited by examiner

*Primary Examiner*—Christian LaForgia (57) ABSTRACT

The invention relates to a method for data transmission, comprising the following steps: first data from a stochastic process is inputted into at least a first and a second subscriber of a communication network; and a symmetrical key is produced on the basis of the first data in both the first and the second subscriber, and stored in the same, for an encoded data transmission between said subscribers.

19 Claims, 4 Drawing Sheets

METHOD FOR ENCODED DATA TRANSMISSION VIA A COMMUNICATION NETWORK

CROSS REFERENCE TO RELATED APPLICATIONS

This application claims priority to the German application No. 10330643.9, filed Jul. 7, 2003 and to the International Application No. PCT/EP2004/007378, filed Jul. 6, 2004 which are incorporated by reference herein in their entirety.

FIELD OF INVENTION

The invention relates to a method for encrypted data transmission as well as to a corresponding computer program product and to a communication system, in particular for the users of an automation system.

BACKGROUND OF INVENTION

Various methods for encrypted data transmission are known from the prior art. Basically a distinction is made in this field between asymmetrical and symmetrical encryption methods.

Symmetrical encryption methods are also referred to as "private key" encryption. With a symmetrical encryption method, the users taking part in the communication have the same secret key, which is used both for the encryption and for the decryption. Examples of symmetrical encryption methods known from the prior art are DES, Triple DES, RC2, RC4, IDEA, and Skipjack.

A common disadvantage of symmetrical encryption methods known from the prior art is that the symmetrical keys must be transmitted to the individual users before the encrypted communication starts, with the possibility that said transmission can be intercepted.

With asymmetrical encryption methods, which are also referred to as "public key" encryption, a public key is used for the encryption. The data encrypted using the public key of a user can only be decrypted using the secret private key of said user. Known a symmetrical encryption methods are Diffie-Hellmann and RSA.

SUMMARY OF INVENTION

It is an object of the invention to create an improved encryption method for encrypted data transmission.

The objects underlying the invention are achieved in each case by the features of the independent claims. Preferred embodiments of the invention are set forth in the dependent claims.

According to the invention, a symmetrical encryption method is used for the protected data transmission, for example over a public communication network such as the internet. In this case, in contrast to the prior art, the secret symmetrical key is not distributed to the individual users of the communication network, but instead the symmetrical key is generated locally in each case in the individual users.

Toward that end, data taken from a stochastic process is input into the individual users. On this basis identical symmetrical keys are then generated locally in each case in the users, which keys will henceforward be used for the encrypted data transmission between the users.

According to a preferred embodiment of the invention the data which forms the basis for the generation of the symmetrical keys in the users is generated by means of a random number generator which uses a stochastic process, such as, for example, thermal (Johnson-Nyquist) noise or a radioactive decay process for the random number generation. Compared to random number generators based on generator polynomials, a random number generator of said kind has the advantage that no pseudo-random numbers are generated. This is because the generator polynomial can in principle be determined by an attacker through analysis of the communication between the users, in particular when cyclical communication is involved.

According to a further preferred embodiment, at least one measured value is determined from a stochastic process. For example, the data required for generating the symmetrical keys is obtained from the least significant bit positions of the measured value or values.

According to a further preferred embodiment of the invention, at least one time-variable parameter of an automation system is used as the stochastic process. For this, various measured values supplied, for example, by sensors of the automation system may prove suitable, such as, for example, temperature, speed of rotation, voltage, current, flow rate, velocity, concentration, humidity, etc. The corresponding measured values are stochastic, but can have periodic components, for example. In order to reduce such periodic components, only the least significant bit positions of the measured values, for example, may be used for forming the symmetrical keys.

According to a preferred embodiment of the invention, stochastic data is acquired by at least two of the users independently of one another. The stochastic data collected by one of the users is transmitted to the other user or users. Overall, each of the users receives all of the stochastic data in this way. The data is then combined in order to obtain a basis for generating the symmetrical key in each particular case.

According to a further preferred embodiment of the invention, the data which forms the basis for generating the symmetrical key in the users is transmitted over a public network, such as, for example, the internet, or via an Ethernet, for example a LAN, WAN or WLAN.

According to a further preferred embodiment of the invention, the keys are generated in the users at the request of a master user, the corresponding request being transmitted to the users via the communication network. For example, a corresponding request is made when the utilization of the capacity of the communication network for useful data (payload) transmission is relatively low, in order then to use the unused bandwidth for transmitting data as a basis for the key generation in the users. This approach is advantageous in particular when the users communicate via the internet.

If, on the other hand, an Ethernet is used, for example, all the users can "listen in" on the data traffic on the Ethernet. In this case the key generation in the individual users can be initiated such that the master user outputs a corresponding trigger command onto the Ethernet.

According to a further preferred embodiment of the invention, the stochastic data is transmitted and the keys are generated in the users at predetermined times or after predetermined time intervals. In this embodiment the users of the communication network have a synchronous time base.

According to a further preferred embodiment of the invention, different symmetrical encryption methods are used for key generation by the users and corresponding different symmetrical keys generated. For the encrypted data transmission a changeover is effected for example periodically between the encryption methods in order to increase the security of the encrypted data transmission further.

According to a further preferred embodiment of the invention, the data for the different encryption methods is formed by different combinations of the stochastic data supplied by the individual users.

The present invention is of particular advantage for use with automation systems. The algorithms for key generation in the individual users can be specified, for example, during the planning and configuration of the system in the project planning phase. The corresponding key generation algorithms are kept secret by the manufacturer of the system. In addition to protection of the encrypted data transmission this also provides protection against the use of unauthorized components, from a third-party manufacturer for example, in the automation system.

The algorithms are preferably stored in protected memory areas of the automation devices of the automation system, for example in EPROMs or chipcards that are inserted into card readers of the automation devices by authorized users.

The present invention is particularly advantageously used for components of automation-controlled systems that are linked to one another via public networks. By means of the inventive encrypted data transmission between the users of an automation-controlled system of said kind, unauthorized interventions by third parties are avoided, in particular also when a wireless transmission technology is used between the users.

According to a further preferred embodiment of the invention, the encrypted data transmission is used for the purposes of remote maintenance or what is referred to as "teleservice" of the system. Here, too, the data transmission method according to the invention offers protection against interception of the transmitted system data or, as the case may be, tampering interventions.

In addition to an automation-controlled system, the invention can also be advantageously used for the purposes of telecommunication between users or for the purposes of communication between the components of a motor vehicle, shipboard, aircraft or railroad electronics assembly.

BRIEF DESCRIPTION OF THE DRAWINGS

Preferred embodiments of the invention will be explained in more detail below with reference to the drawings, in which.

DETAILED DESCRIPTION OF INVENTION

Figure 1:
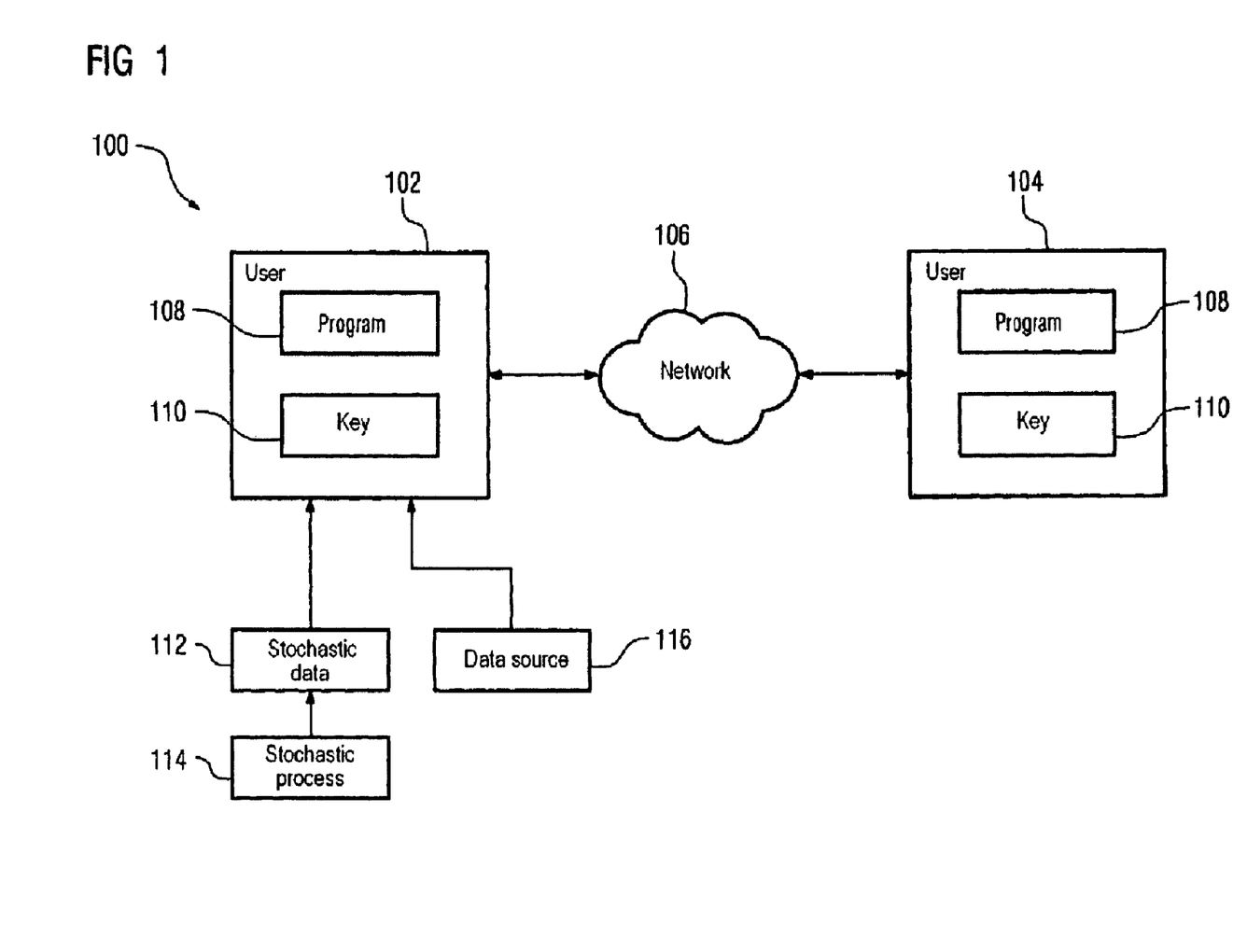
FIG. 1 shows a block diagram of a first embodiment of a communication system according to the invention.

FIG. 1 shows a communication system 100 in which at least the users 102 and 104 can exchange data via a network 106. In a practical embodiment the communication system 100 can include a plurality of users of this kind.

The users 102, 104 of the communication system 100 each have a program 108 for a symmetrical encryption method. Symmetrical keys can be generated with the aid of the programs 108 on the basis of input data, and useful data to be transmitted can also be encrypted and decrypted.

The users 102, 104 also each have a memory 110 for storing the symmetrical key generated by the respective program 108.

The user 102 is connected to an acquisition module 112; said acquisition module 112 serves to collect stochastic data from a stochastic process 114. The stochastic process 114 can be for example the voltage signal of a noisy resistance.

The user 102 is also connected to a data source 116. Data supplied by the data source 116 is to be transmitted by the user 102 via the network 106 to the user 104.

During operation of the communication system 100, stochastic data from the stochastic process 114 is recorded by the acquisition module 112. The stochastic data is input into the user 102. The stochastic data is transmitted by the user 102 via the network 106 to the user 104. The transmission can be encrypted or unencrypted.

The program 108 is started in the user 102 in order to generate a symmetrical key on the basis of the stochastic data supplied by the acquisition module 112, said key being stored in the memory 110. Analogously the program 108 is started in the user 104 in order to use the stochastic data received via the network 106 from the user 102 for generating the same symmetrical key which is stored in the memory 110 of the user 104.

If further users are present in the communication system 100, said further users also receive the stochastic data from the user 102 via the network 106 and in each case generate the symmetrical key locally with the aid of the respective program 108.

Data which is supplied to the user 102 by the data source 116 can now be transmitted in encrypted form via the network 106 to the user 104. Toward that end the useful data to be transmitted is encrypted with the aid of the program 108 of the user 102 and the symmetrical key stored in the memory 110 of the user 102.

The encrypted useful data is transmitted via the network 106 and received by the user 104. There, the data is decrypted by the program 108 of the user 104 with the aid of the symmetrical key stored in the memory 110 of the user 104.

The generation of the stochastic data as a basis for generating the symmetrical keys in the users 102, 104 can be performed here by a stochastic random number generator which uses, for example, the output voltage of a noisy resistance as the stochastic process.

Alternatively, the data supplied by the data source 116 can also be used as stochastic data as a basis for generating the symmetrical key. This is advantageous in particular when the data source 116 supplies measured values of quantities or parameters that vary over time, of an automation system for example. For example, certain process parameters in an automation system of said kind, such as the temperature, pressure, speed of rotation, etc., are not deterministic, but more or less random with more or less periodic components. A corresponding measured value supplied by the data source 116 can therefore be used as a stochastic datum for symmetrical key generation, a separate acquisition module 112 or, as the case may be, an additional stochastic process 114 being superfluous in this case.

Figure 2:
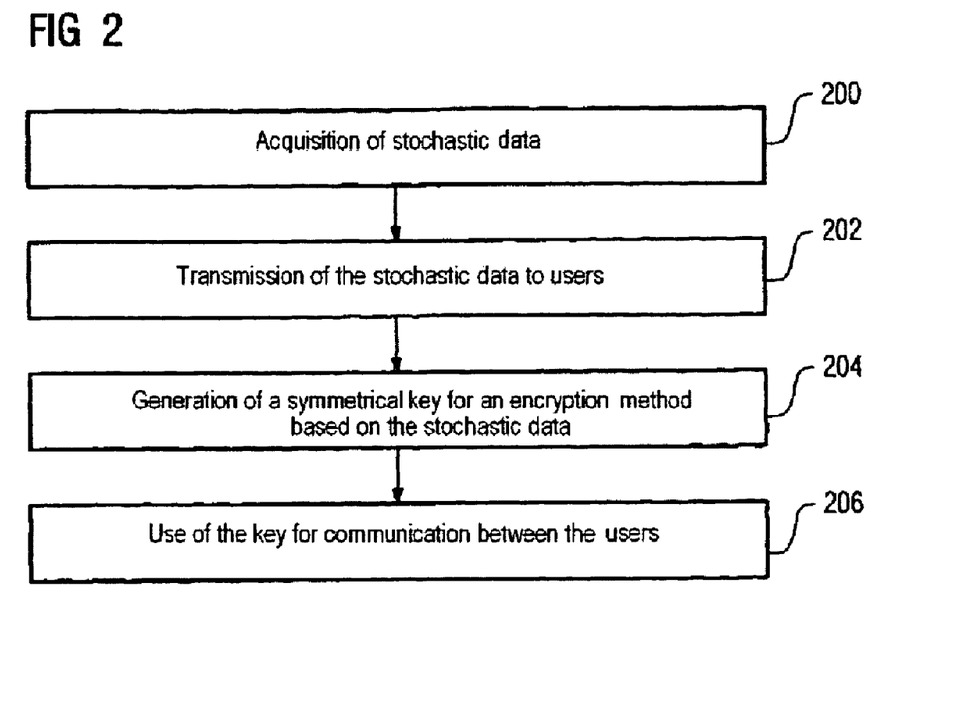
FIG. 2 shows a flowchart of a first embodiment of the data transmission method according to the invention.

FIG. 2 shows a corresponding flowchart. Stochastic data is acquired in step 200. In this case said data can be stochastic data supplied by a random number generator or the useful data supplied by a data source. The stochastic data is transmitted to the users of the communication system in step 202. This transmission can take place in encrypted or unencrypted form over a public network.

In step 204, identical symmetrical keys are generated locally in each case by the users on the basis of the stochastic data. For this purpose use is made of a secret encryption method which is implemented in each case in the users by means of a computer program.

Each of the users that received the stochastic data in step 202 therefore inputs said stochastic data into the computer program in order to generate a symmetrical key which is stored locally by the respective user.

As a result all the users therefore have the symmetrical key without this having been transmitted over the network 106. Even by eavesdropping on the transmission of the stochastic data via the network 106, a third party cannot come into possession of the key, since the secret encryption method or, as the case may be, the corresponding computer program is required for this. In order to avoid unauthorized accesses to the computer program this is preferably stored in a protected memory area, for example in an EPROM or on a chipcard.

After the identical symmetrical keys based on the stochastic data have been generated in the individual users, said keys are used for the protected communication between the users in step 206.

Figure 3:
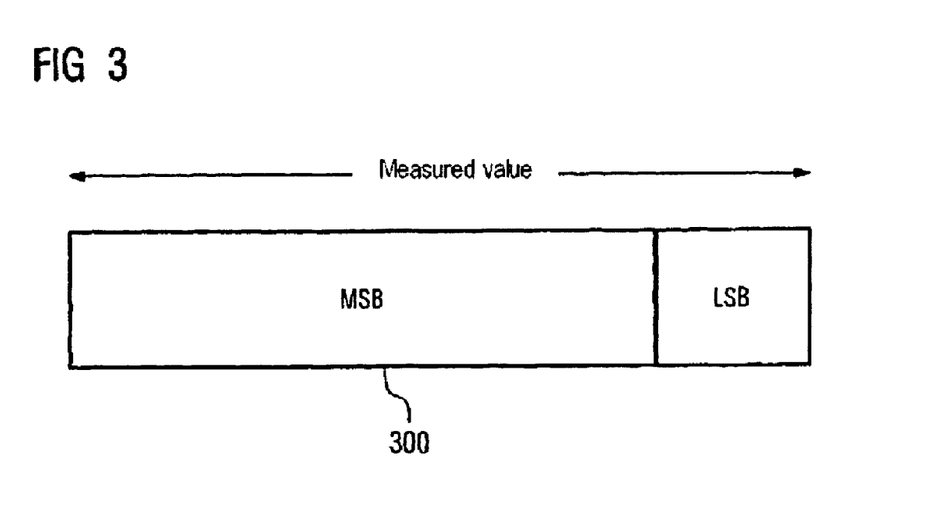
FIG. 3 shows the generation of data as a basis for generating the key from a measured value.

FIG. 3 shows an exemplary embodiment for generating stochastic data as a basis for generating the symmetrical keys. For example, a measured value 300 having a length of, for example, 32 bits is supplied by the data source 116 (cf. FIG. 1). Only the eight least significant bit (LSB) positions of the measured value 300, for example, are used for generating the keys.

In other words, therefore, the least significant bit positions of the measured value 300 form the stochastic data that is used for generating the keys. In this case the use of only the least significant bit positions of the measured value 300 has the advantage over the use of the full measured value 300 or of only the most significant bit (MSB) positions that periodic components of the measured signal are reduced or eliminated.

Figure 4:
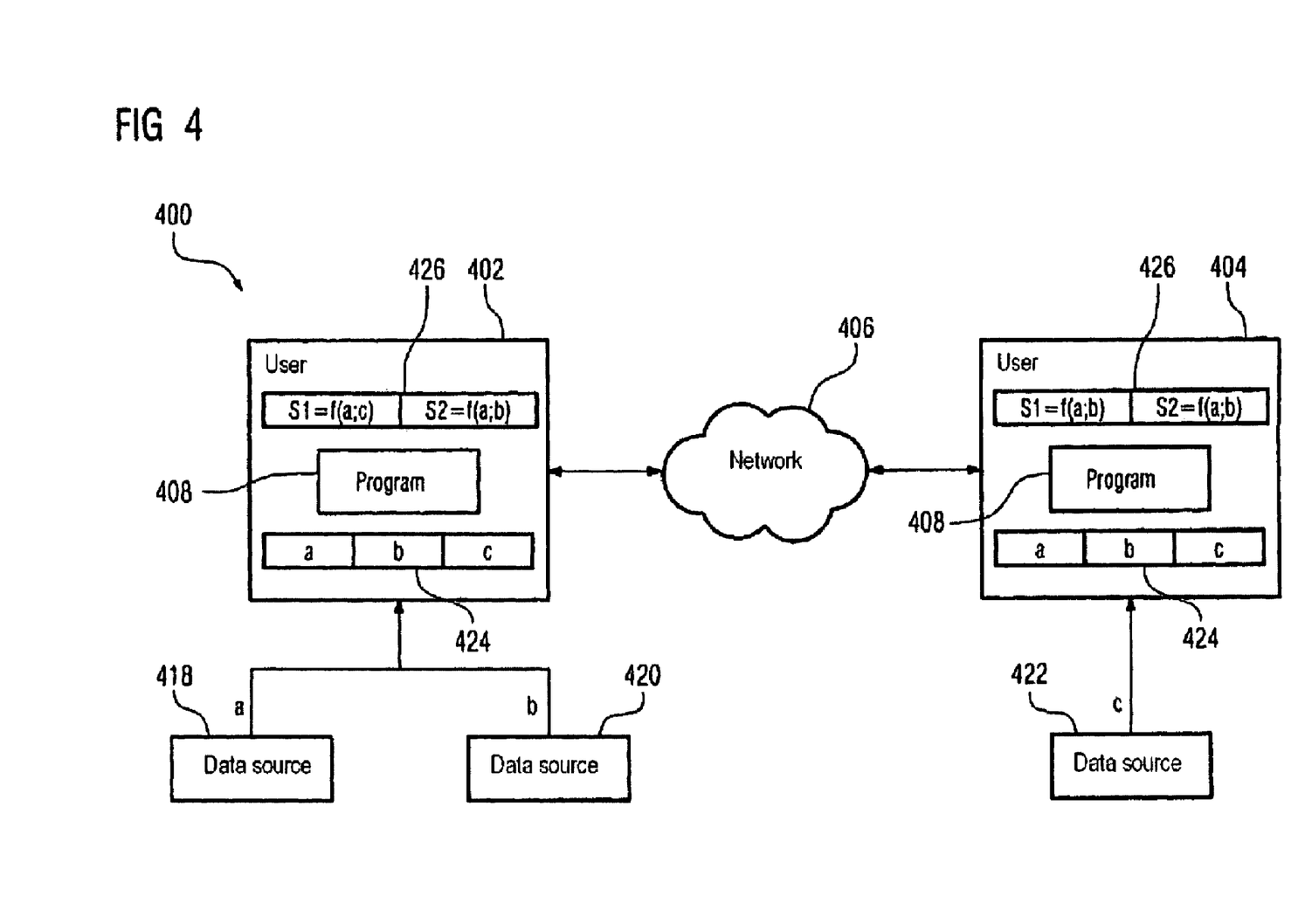
FIG. 4 shows a block diagram of a further preferred embodiment of a communication system according to the invention.

FIG. 4 shows a block diagram of a communication system 400. Elements of FIG. 4 that correspond to elements of the embodiment shown in FIG. 1 are identified by means of reference numerals increased by 300.

In the embodiment according to FIG. 4, the user 402 is connected to the data sources 418 and 420 which continuously supply the measured values a and b. The user 404 is connected to the data source 422 which continuously supplies the measured value c. The measured value a is, for example, a temperature, the measured value b a rotary speed, and the measured value c a pressure.

The users 402 and 404 each have a memory 424 for storing the measured values a, b and c. In addition, the users 402 and 404 each have a memory 426 for storing the symmetrical keys S1 and S2. The key S1 is generated by the program 408 on the basis of a combination of the measured values a and c and the key S2 on the basis of the measured values a and b.

During operation of the communication system 400, the symmetrical keys S1 and S2 are generated in the users 402 and 404 as well as in further essentially identically structured users.

For this purpose the measured values a, b and c output at a given moment in time by the data sources 418, 420, 422 are stored in the memory 424. That is to say, the user 402 stores the measured values a and b in its memory 424 and transmits said values over the network 406 to the further users, i.e. in particular to the user 404, where the measured values a and b are also stored in the memory 424.

On the other hand the user 404 stores the measured value c in its memory 424 and transmits the measured value c over the network 406 to the other users, i.e. in particular to the user 402, where the measured value c is also stored in the respective memory 424. As explained with reference to FIG. 3, preferably only the least significant bit positions are stored in the memories 424 in place of the full measured values.

The program 408 of the user 402 combines the measured values a and b which are stored in the memory 424 or, as the case may be, the least significant bit positions of said measured values with one another, for example by appending the corresponding bits to one another. The data word resulting from this is used by the program 408 for generating the key S2.

Analogously, the key S1 is generated with the aid of the program 408 on the basis of the measured values a and c. The keys S1 and S2 are stored in the memory 426 of the user 402. The same operation in principle is run in the user 404 as well as in the further users of the communication system 400, with the result that the keys S1 and S2 are present in all users.

Subsequently, an encrypted transmission of the measured values a, b and c takes place over the network 406, with the key S1 being used for the encrypted data transmission at specific times and the key S2 being used for the encrypted data transmission at specific times. These times can be predefined or event-driven. For example, one of the users can assume the function of a master user for initiating the key generation or for switching over between the keys in the different users.

In the exemplary embodiment considered here, therefore, the measured values a, b and c are used to form different data words by means of a predefined combinatorial mechanism, which data words for their part are the basis for generating different symmetrical keys. Said combinatorial mechanism can be invariable over time or variable over time.

Figure 5:
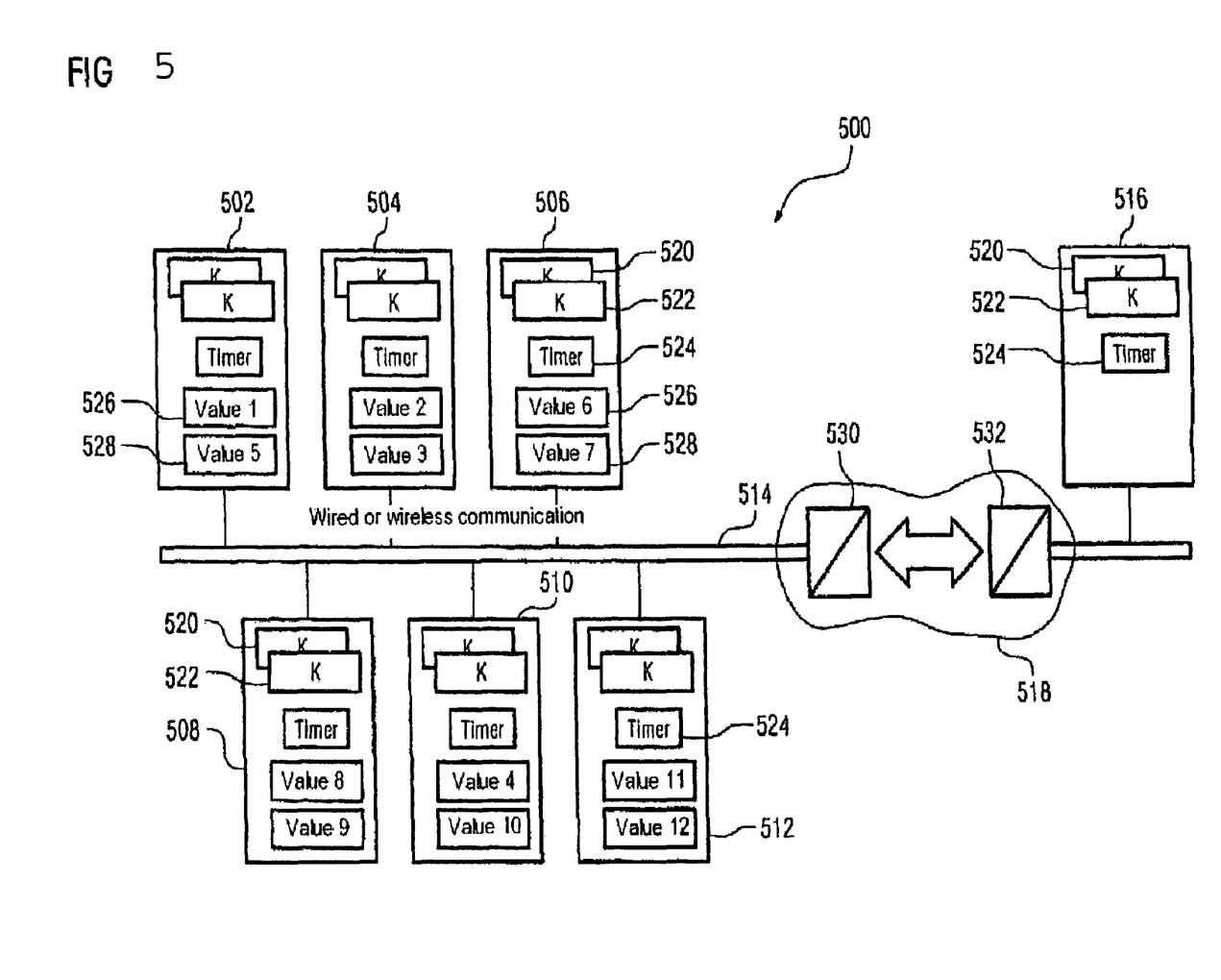
FIG. 5 shows a block diagram of a preferred embodiment of an automation system according to the invention.

FIG. 5 shows an automation system 500 comprising the automation devices 502, 504, 506, 508, 510 and 512. The automation devices 502 through 512 are interconnected by means of a data bus 514. This can be, for example, an Ethernet. A further automation device 516 can exchange data via a public network 518 such as, for example, the internet or a wireless mobile radio link.

Each of the automation devices 502 through 512 and 516 has an encryption program 520 and an encryption program 522. Further encryption programs may also be present. The encryption programs 520 and 522 each provide different symmetrical encryption methods.

In addition, each of the automation devices 502 through 512 and 516 has a timer 524. The timers 524 are synchronized with one another, so a uniform synchronous time base is created for the automation system 500.

Each of the automation devices 502 through 512 also has a memory 526 and a memory 528. The memory of the automation device 502 is used for storing the "Value 1" which is output by a corresponding measured value sensor 1. The memory 528 of the automation device 502 is used for storing the "Value 5" which is output by a measured value sensor 5. The situation is analogous for the memories 526 and 528 of the further automation devices 504 through 512, each of which is assigned to specific measured value sensors, as can be seen from FIG. 5. For the sake of clarity, the measured value sensors are not shown in FIG. 5.

The data word which serves as a basis for generating a symmetrical key is generated by means of a predefined combinatorial mechanism, for example from the concatenation of the values 1, 2, 3 and 4. The data word obtained by means of said concatenation is in each case input into the encryption programs 520 and 522 in order to generate corresponding symmetrical keys.

For the encrypted data transmission between the automation devices 502 through 512 and 516, the encryption programs 520 and 522 are used in a preconfigured chronological sequence, i.e. it is pre-planned for each instant in time whether the encryption program 520 or 522 is to be used for the encrypted data transmission.

The automation device 516 is, for example, a remote maintenance device. The automation device 516 also receives the measured values 1, 2, 3 and 4 via the network 518 in order to compute the respective keys with the aid of the encryption programs 520 and 522. The measured values are transmitted in this case by the automation devices 502, 504 and 510 via the data bus 514 and the network 518 to the automation device 516. After the key generation has been completed, remote maintenance can be performed by the automation device 516, the data transmitted over the network 518 during this activity being protected against interception and manipulation.

The network has the network access points 530 and 532 via which the data traffic flows between the data bus 514 and the automation device 516. For the transmission over the network 518, a further encryption can be performed by encrypting the already encrypted data a second time. By this means security against external attacks is further increased.

This is advantageous in particular when the network 518 is a public network. The further encryption for the transmission over the network 518 can be performed analogously to that shown in FIG. 1, with the network access point 530 taking on the role of the user 102 and the network access point 532 the role of the user 104.

It is of particular advantage that the protected data transmission between the automation devices is handled independently of general security infrastructures, such as, for example, central trust centers, but is based on data which is variable over time and originates from the system itself. It is of further advantage that an implicit authentication of the automation devices is also carried out as a result of the secret encryption programs 520, 522. Unauthorized automation devices for which the system is not approved or automation devices from third-party manufacturers that do not have the requisite licenses do not have the secret encryption programs 520, 522 and consequently also cannot be used in the automation system.

In order to increase security further, a list of encryption programs can be loaded in each of the individual automation devices. Said encryption programs are preferably loaded during offline operation of the automation system in order to avoid the encryption programs being spied on. The encryption programs are stored for example in protected memory areas of EPROMs or chipcards.

The changeover times for switching between the encryption programs and the associated keys can be determined on a command-controlled basis by one of the automation devices, which device thereby assumes the function of a master. Alternatively, the changeover times can be configured in advance by means of predefined absolute times or programmed on a cyclical or periodic basis.

Alternatively, an algorithm fed by random values of the system can be used for specifying the changeover times. A further possibility is that the utilization of the data bus 514 is monitored and the key generation or, as the case may be, changeover between the encryption programs initiated at a time when the utilization level of the data bus 514 is low. This has the advantage that unused bandwidth of the data bus 514 can be used for transmitting the measured values to the individual automation devices.

The invention claimed is:

1. A method for transmitting data, comprising:
   providing each of a plurality of users of a public communication network with a secret encryption program and a secret algorithm for generating an encryption key;
   by a first user of the public communication network:
   receiving a first random value originating from useful data produced in a first stochastic process;
   generating a first symmetrical encryption key based on the first random value using the secret algorithm;
   transmitting the first random value to a second user remote from the first user over the public communication network;
   by the second user:
   receiving the first random value from the first user; and
   generating the first symmetrical encryption key based on the received random value using the secret algorithm;
   the first and second users then encrypting and communicating the useful data over the public communication network using the secret encryption program and the first symmetrical encryption key; and
   wherein the first random value comprises a digital value derived from the useful data;
   wherein the first user comprises a remote maintenance device;
   the second and remaining users comprise respective automation devices connected to each other by a bus;
   each of the respective automation devices obtaining plural random values of stochastic data;
   combining two different subsets of the plural random values, producing two different data words;
   communicating the two different data words to the respective automation devices and to the remote maintenance device;
   inputting the two different data words into two different encryption programs that are identical in each of the respective automation devices and the remote maintenance device;
   generating two different symmetrical encryption keys from the two different data words via the two different encryption programs in each of the respective automation devices and the remote maintenance device; and
   communicating encrypted data using one or the other of the two different symmetrical encryption keys at a given time among the respective automation devices and the remote maintenance device; and
   switching between the two different symmetrical encryption keys at a predetermined time among all of the respective automation devices and the remote maintenance device at once.

2. The method as claimed in claim 1, wherein the first stochastic process includes an operational time-variable parameter of an automation system.

3. The method as claimed in claim 1, further comprising:
   by the second user:
   receiving a second random value originating from a second stochastic process;
   generating a second symmetrical encryption key based on the second random value;
   transmitting the second random value to the first user;
   by the first user:
   receiving the second random value from the second user; and
   generating the second symmetrical encryption key based on the received random value.

4. The method as claimed in claim 3, wherein one of the plurality of users is designated as a master user, and the first and second symmetrical encryption keys are generated by the plurality of users upon a request by the master user of the public communication network.

5. The method as claimed in claim 3, wherein the first and second symmetrical encryption keys are generated at predetermined times or after a lapse of a predetermined time interval.

6. The method as claimed in claim 1, wherein the first random value is transmitted over the public communication network at a time of low utilization of the public communication network.

7. The method as claimed in claim 3, wherein the first symmetrical encryption key is used to encrypt data transmitted during a first time interval and the second symmetrical encryption value is used to encrypt data transmitted during a second time interval.

8. The method as claimed in claim 1, wherein the first random value is transmitted using an asymmetrical encryption method.

9. The method as claimed in claim 1, wherein the first random value is transmitted to the plurality of users and the first symmetrical encryption key is generated at each of the plurality of users using the secret algorithm.

10. The method as claimed in claim 1, wherein the first random value comprises a combination of at least two digital values obtained from respective different sensors indicating respective different operational measurements of an automation system.

11. The method as claimed in claim 10, wherein the first random value comprises a concatenation of at least two digital values obtained from respective different sensors indicating respective different operational measurements of an automation system.

12. The method as claimed in claim 1, wherein the secret algorithm is provided to the plurality of users on respective readable protected memory devices.

13. A communication system, comprising:
at least first and second users remote from each other; and
a public communication network for transmitting data between the at least first and second users,
the first user comprising:
a first receiver for receiving a first random value originating from useful data produced by a stochastic process,
an encryption key generator for generating a first symmetrical encryption key based on the first random value,
a storage unit for storing the first symmetrical encryption key, and
a transmitter for transmitting the first random value to the second user via the public communication network;
the second user comprising:
a first receiver for receiving the first random value from the first user, and
an encryption key generator for generating the first symmetrical encryption key based on the first random value received from the first user,
wherein data transferred between the users is encrypted and unencrypted via the first symmetrical encryption key; and
wherein the first random value comprises a first digital value derived from a first useful datum;
wherein the first user comprises a remote maintenance device;
the second and remaining users comprise respective automation devices connected to each other by a bus;
each of the respective automation devices obtaining plural random values of stochastic data;
combining two different subsets of the plural random values, producing two different data words;
communicating the two different data words to the respective automation devices and to the remote maintenance device;
inputting the two different data words into two different encryption programs that are identical in each of the respective automation devices and the remote maintenance device;
generating two different symmetrical encryption keys from the two different data words via the two different encryption programs in each of the respective automation devices and the remote maintenance device; and
communicating encrypted data using one or the other of the two different symmetrical encryption keys at a given time among the respective automation devices and the remote maintenance device; and
switching between the two different symmetrical encryption keys at a predetermined time among all of the respective automation devices and the remote maintenance device at once.

14. The communication system as claimed in claim 13, wherein at least one high order bit of the first digital value is removed to reduce a periodic component of the operational measurement.

15. The communication system as claimed in claim 13, wherein the second user further comprises:
a second receiver for receiving a second random value originating from a stochastic process, and
a transmitter for transmitting the second random value to the first user via a public communication network,
the encryption key generator generates a second symmetrical encryption key based on the second random value, and
the storage unit stores the first and the second symmetrical encryption keys, wherein the first user further comprises:
a second receiver for receiving the second random value from the second user,
the encryption key generator generates a second symmetrical encryption key based on the second random value, and
the storage unit stores the first and the second symmetrical encryption keys,
wherein data transferred between the users is encrypted and unencrypted via the symmetrical encryption keys;
wherein the second random value comprises a digital value derived from a second useful datum.

16. The communication system as claimed in claim 15, wherein the first user is a master user for triggering the generating of the first and second symmetrical encryption key by issuing a request via the public communication network.

17. A method for transmitting data, comprising:
by a first user of a public communication network:
storing a first random measured value received from a first stochastic process;
generating a first symmetrical encryption key based on the first random measured value;
transmitting the first measured random value to a second user remote from the first user on the public communication network;
receiving a second random measured value from the second user;
generating a second symmetrical encryption key based on the received random value;
by the second user:
storing the second random measured value received from a second stochastic process;

generating the second symmetrical encryption key based on the second random measured value;

transmitting the second random measured value to the first user;

receiving the first random measured value from the first user;

generating the first symmetrical encryption key based on the received first random measured value, wherein the first symmetrical encryption key is used to encrypt data transmitted between the first and second users during a first time interval, and the second symmetrical encryption key is used to encrypt data transmitted between the first and second users during a second time interval; and wherein the first and second random measured values each comprise a respective useful datum from a respective different sensor indicating an operational measurement of an automation system;

wherein the first user comprises a remote maintenance device;

the second and remaining users comprise respective automation devices connected to each other by a bus;

each of the respective automation devices obtaining plural random values of stochastic data;

combining two different subsets of the plural random values, producing two different data words;

communicating the two different data words to the respective automation devices and to the remote maintenance device;

inputting the two different data words into two different encryption programs that are identical in each of the respective automation devices and the remote maintenance device;

generating two different symmetrical encryption keys from the two different data words via the two different encryption programs in each of the respective automation devices and the remote maintenance device; and communicating encrypted data using one or the other of the two different symmetrical encryption keys at a given time among the respective automation devices and the remote maintenance device; and switching between the two different symmetrical encryption keys at a predetermined time among all of the respective automation devices and the remote maintenance device at once.

18. The method as claimed in claim 17, wherein the first random value is an input to a function and an output of the function is used to generate the first symmetrical encryption key.

19. The method as claimed in claim 17, wherein the second random value is an input to a function and an output of the function is used to generate the second symmetrical encryption key.

* * * * *